July 30, 1929.    A. VEILLEUX    1,722,402
SPRINGBOARD ANCHORING MECHANISM
Filed March 21, 1928
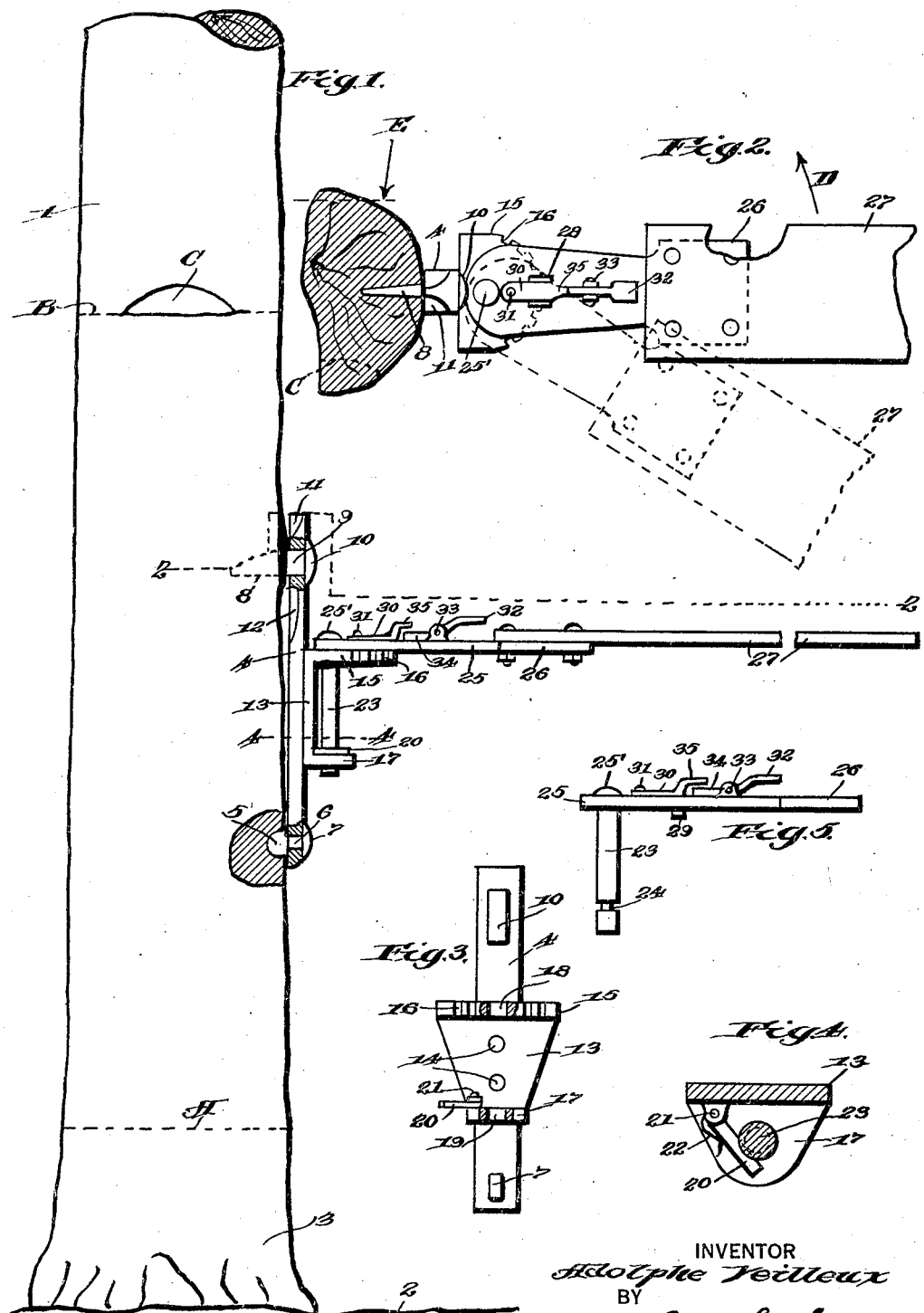

Patented July 30, 1929.

1,722,402

UNITED STATES PATENT OFFICE.

ADOLPHE VEILLEUX, OF ST. MARIES, IDAHO.

SPRINGBOARD-ANCHORING MECHANISM.

Application filed March 21, 1928. Serial No. 263,473.

The object of this invention is to provide an improved means whereby trees may be felled at relatively high elevations from the base or stump.

In felling trees it often happens that the trunk for a height of several feet above the stump, is unsuitable for lumber, and hence it has been the practice to first fell the tree near the stump, and then after the tree has been felled, cut off the unusable portion and leave it on the ground. This involves two sawing operations.

It is an object of this invention to eliminate one of these sawing operations and the invention involves what is known as a spring board, and the invention consists in an improved means for securing or anchoring a spring board at any practical or suitable elevation above the stump so that the sawyer can mount the board and fell the tree at such elevation above the unusuable portion of the trunk so that in one sawing operation, all of the tree which has been felled, will be usable.

One of the features of my invention consists in means for supporting a spring board in such a manner that the board may be adjustably shifted by the sawyer as the sawing operation proceeds, and without the necessity of the sawyer dismounting from the board.

A further feature consists of means for anchoring the structure in such a manner as to resist and restrain the same from taking an abnormal position irrespective of the position to which the spring board may be shifted.

The invention has many other objects and features which will be more fully described in connection with the accompanying drawing and which will be more particularly pointed out in and by the appended claim.

In the drawing:

Fig. 1 is a view in side elevation of a standing tree showing how the device of my invention is mounted thereon.

Fig. 2 is a plan sectional view on line 2—2 of Fig. 1, showing how the spring board can be laterally shifted as the sawing operation proceeds.

Fig. 3 is a view of the anchoring structure detached from the balance of the mechanism, partly in section and looking from the right of Fig. 1.

Fig. 4 is an enlarged sectional view on line 4—4 of Fig. 1.

Fig. 5 is a view in side elevation of the spring board mounting means shown detached from the balance of the mechanism.

Like characters of reference designate similar parts throughout the different figures of the drawing.

I have shown a tree 1 rising from the ground line 2 and have designated the stump at 3. Dotted line A indicates the usual sawing line where the trunk of the tree is sound, and when sawing at this relatively low elevation, the sawyer would of course stand on the ground. However, in the tree illustrated, it will be assumed that the trunk is unsound and unfit for lumber below dotted line B, and that it is desired to therefore fell the tree from this elevated point, leaving the unsound trunk standing.

I will now specifically describe the manner in which the device of my invention can be employed to meet such a problem.

As shown, the device of my invention consists of an anchorage structure that involves an anchor bar 4, which may be of substantially the form shown. Near the lower end of said bar 4, I provide the same with what I will term an initial anchoring or alining member or blade 5 which is preferably of a short thin construction that may easily be driven into the tree, as clearly shown in Fig. 1. Said blade 5 may have a shank 6, extending through bar 4, and the same may be riveted to said bar, as indicated at 7, or may be loose in said bar. Thus, in driving the blade 5 into the tree, the impact of the mall or whatever instrument is used, will be sustained by the head 7, and will not be imposed upon the bar 4.

Said bar is provided with a supporting member or spike 8, which may have its shank 9 extended through bar 4 and a head 10 for receiving the impact of a driving instrument. The spike 8 is relatively long and thin, as clearly shown in Figs. 1 and 2, and may be described as of blade-like tapering form, which I find in actual practice, is highly efficient for the purpose.

Adjacent the spike 8, I suitably recess the bar 4, as indicated at 11 and 12, to facilitate insertion of a prying instrument in detaching the bar 4 from the tree after the sawing operation has been completed.

As a part of the anchorage structure, I employ a bearing or supporting bracket of generally U-shape, the bight being indicated at 13 and being rigidly secured to the bar 4, as by means of rivets 14. The upper limb is preferably in the form of a bearing shelf 15 which may have the form shown in Figs. 1 and 2, and which, in practice, may be stiffened by ribs or braces, not shown. The semi-circular edge of the shelf 15 is shown provided with notches 16, the purpose of which will be presently described. The lower limb 17 does not project as far as shelf 15, and both limbs having alined openings 18 and 19 which serve as bearings for a pivot pin, as will later appear. Said limb 17 is provided with a retaining bar 20, pivoted at 21, and which may or may not be urged into an operative position by a spring 22, as desired. The function of this retaining bar is to engage the pivot pin. It will thus be seen that the bar 4 and the bracket attached thereto constitute one integer of the device which I will refer to as the anchoring structure.

I will next refer to that portion of the device to which the spring board is attached, and which may be termed the spring board structure.

I employ a pivot pin 23, which is insertable downwardly through opening 18 and into opening 19, and which is suitably provided with an annular groove 24, into which the retaining bar 20 may be shifted in order to avoid any possibility of the pin 23 being accidently dislodged from opening 19. A bearing plate 25 is suitably fixed to the upper end of said pin 23, the head 25' of which may be riveted or otherwise secured thereto. When in position, the bearing plate 25 slidably engages the bearing shelf 15 and said plate 25 will project therefrom in a substantially horizontal plane, as clearly shown in Figs. 1 and 2. I preferably enlarge the outer end of plate 25, as indicated at 26, and to this outer end is bolted or otherwise suitably secured the inner end of a wood or like spring board 27. This board 27 is of sufficient width and length to support the sawyer, and it will be understood that the plate 25 will be made of steel or other suitable and strongly constructed material to withstand the weight imposed on the spring board 27.

It is a feature of my invention to provide means whereby as the sawing proceeds, the sawyer can change his position with respect to the tree without dismounting from the spring board, and the latter will always be locked and held firmly in any position to which it may be adjusted.

A suitable opening 28 is formed in plate 25, and a dog 29 extends through said opening into range of the locking notches or teeth 16. Said dog 29 may be secured to a spring strip 30, anchored at 31, to plate 25, for always holding said dog 29 in engagement with one of said notches. A foot treadle 32, is pivoted at 33 to plate 25, and has a projection 34 which extends under a finger 35, with which said dog 29 is equipped.

It will thus be seen that by actuating treadle 32, to release the dog 29, and then using the other foot to kick the board 27, in the desired direction, the sawyer can actually shift his position with respect to the tree in order to saw to the best advantage.

In starting the operation, the under-cut would be made at C, if it were desired to fell the tree in that particular direction. Then, the board 27 would probably be adjusted in the direction of arrow D, from the full line position, in order to effectively start sawing on line E. As the sawyer worked toward the under-cut C, he would gradually change the position of the spring board toward the dotted line position, as shown in Fig. 2.

It will be seen that by merely releasing the retaining bar 20, the spring board structure can be detached from the anchoring structure, thereby greatly facilitating movement of the mechanism from one tree to the other and also affording equally great advantages in being able to anchor the bar 4 to a tree before attaching the spring board structure.

It will now be clear that when the spring board 27 is adjusted to the angular position shown in dotted lines in Fig. 2, the stress on bar 4 would tend to shift the latter from a vertical position if it were not for the aligning blade 5.

It is believed that the device of my invention will be fully understood from the foregoing description, and while I have herein shown and described one specific form of my invention, I do not wish to be limited thereto except for such limitations as the claim may import.

I claim:

In a sawyer's spring board structure, an elongated anchor bar having near its upper end a relatively elongated blade-like spike adapted to be driven into a standing tree below the proposed line of cut to support said structure, said bar carrying near its lower end a relatively short stabilizing blade adapted to be subsequently driven into the tree to hold said bar in a substantially vertical position, a substantially U-shaped supporting bracket having a relatively elongated bight rigidly secured to said bar between said spike and blade and having an upper limb in the form of a relatively extended arcuate bearing shelf with spaced notches in its arcuate peripheral edge, the remaining lower limb being relatively short, a pivot pin provided with a head and having its upper portion rotatively journalled in said bearing shelf radially centrally of said notches and having its lower end rotatively journalled in said lower limb, means on said bracket for rotatively engaging said pin to hold the latter in rotative connection with said bracket and being adjustable to permit detachment of said pin from said bracket, a bearing plate secured to said pin below said head and resting on said shelf and movable laterally about said pin as an axis, a spring board having its inner end fixed to said plate and projecting therefrom to support the sawyer, and pawl means carried by said plate and coacting with said notches for locking said plate and board in various lateral positions.

In witness whereof, I have hereunto set my hand.

ADOLPHE VEILLEUX.